(12) United States Patent
Ray et al.

(10) Patent No.: US 7,198,416 B2
(45) Date of Patent: Apr. 3, 2007

(54) OPTICAL COMBINER DEVICE

(75) Inventors: Curtis A. Ray, Alamo, CA (US); Eric B. Grann, San Ramon, CA (US); Brian C. Peters, Alamo, CA (US)

(73) Assignee: Omron Network Products, LLC, Pleasanton, CA (US)

( * ) Notice: Subject to any disclaimer, the term of this patent is extended or adjusted under 35 U.S.C. 154(b) by 0 days.

(21) Appl. No.: 11/044,475

(22) Filed: Jan. 27, 2005

(65) Prior Publication Data

US 2005/0175347 A1     Aug. 11, 2005

Related U.S. Application Data

(60) Provisional application No. 60/541,573, filed on Feb. 4, 2004.

(51) Int. Cl.
*G02B 6/32* (2006.01)
*G02B 6/34* (2006.01)
*G02B 6/36* (2006.01)

(52) U.S. Cl. .............................. 385/93; 385/88; 385/89; 385/92; 385/33; 385/36

(58) Field of Classification Search ............ 385/31–36, 385/88–94
See application file for complete search history.

(56) References Cited

U.S. PATENT DOCUMENTS 6,219,476 B1 * 4/2001 Kususawa et al. ............ 385/33
2005/0069013 A1 * 3/2005 Bhandarkar et al. ........ 372/102

* cited by examiner

*Primary Examiner*—Kevin S. Wood
(74) *Attorney, Agent, or Firm*—Bruce H. Johnsonbaugh

(57) ABSTRACT

An optical device for combining optical signals of different wavelengths is described wherein an array of laser output beams are collimated, directed to propagate along a similar path, and coupled into an optical fiber through a single molded part. The single-part optical coupling module can be constructed in various ways to achieve the desired configuration. One example is a single plastic-injection molded part, containing mechanical alignment features, an array of collimating lenses, and a focusing lens housed within a fiber optic connector ferrule. The laser output beams are separately passed through separate radial sectors of the focusing lens.

9 Claims, 11 Drawing Sheets

OPTICAL COMBINER DEVICE

CROSS-REFERENCE TO RELATED APPLICATION

This application claims the benefit of and priority from United States Provisional Application Ser. No. 60/541,573 filed Feb. 4, 2004.

BACKGROUND AND BRIEF SUMMARY OF THE INVENTION

The present invention pertains to optical communications. More particularly, this invention relates to an optical multiplexing device which spatially combines multi-wavelength light from a plurality of lasers into an optical fiber. In certain preferred embodiments, the improved multiplexing device of the present invention is particularly suited for wavelength division multiplexing systems for the fiber-optic data-communications and telecommunications systems.

In prior art wavelength division multiplexed optical communication systems, many different optical wavelength carriers provide independent communication channels in a single optical fiber. Future computation and communication systems place ever-increasing demands upon communication link bandwidth. It is generally known that optical fibers offer much higher bandwidth than conventional coaxial communications; furthermore a single optical channel in a fiber waveguide uses a small fraction of the available bandwidth of the fiber (typically a few GHz out of several tens of THz). By transmitting several channels at different optical wavelengths into a fiber (i.e., wavelength division multiplexing, or WDM), this bandwidth may be more efficiently utilized.

Prior art optical multiplexing devices combine or separate multiple light signals with varying optical wavelengths. Such optical multiplexing devices have applications for both dense and course wavelength division multiplexing (DWDM & CWDM) for both multi-mode and signal-mode fiber optic data communications and telecommunications. Multiple wave-length light sources are combined into a single optical path for transmission.

The prior art includes inherent problems overcome by the present invention. Prior art wavelength division multiplexed (WDM) devices are typically designed using dielectric filters requiring alignment or expensive waveguides. The combiner/WDM device described herein utilizes plastic-mold injection to create a compact device capable of combining multiple optical signals into a single optical fiber, and which avoids the use of dielectric filters and the use of expensive waveguides. While a single molded device can be constructed to create one embodiment of the present invention, two or more parts can be combined to accomplish the same function, and may be necessary to achieve certain environmental conditions.

The prior art also includes an optical power combiner which utilizes collimators and a focusing lens to concentrate multiple output beams to increase power density; see Lee et al U.S. Pat. No. 5,377,287. The Lee et al device combines the outputs of, for example, 19 passive optical fibers arranged concentrically together with 19 collimating lenses and a Fresnel focusing lens. The Lee et al design does not achieve isolation from unwanted reflections or a uniform coupling efficiency between each fiber optic input and the single output. The present invention, in contrast, uses a separate radial sector of the focusing lens to focus each separate laser output. Each laser output beam of the present invention therefore has the same degree of refraction as it passes through the focusing lens; this feature simultaneously creates a uniform coupling efficiency (as shown below) and prevents unwanted reflections back through the optical pathway to the input lasers. Furthermore, the Lee et al combiner does not multiplex n different wavelength channels, as does the present invention. Therefore, for the above reasons, the Lee et al combiner simply is not effective for communication purposes, which is the primary purpose of the present invention.

The present invention provides, for the first time, an inexpensive, injection molded, one piece optical combiner capable of combining, separately collimating and focusing the output of multiple lasers into a single optical fiber with a uniform, high coupling efficiency. The invention includes optional passive alignment pins molded into the combiner. An optional two piece combiner is also provided for use in certain environments. For example, the invention in one embodiment combines the output of four lasers arranged in a two dimensional, two by two array into a single fiber.

One of the key objects of the present invention is to provide a compact and cost effective optical combiner for both single-mode or multimode fiber optic communication systems, all without requiring the use of dielectric filters and the alignment necessitated by those filters or expensive waveguides.

Another object of the present invention is to minimize optical loss due to divergence of light between the source coupling optics and the fiber optic connector coupling optics.

Another object of the present invention is to minimize reflections directly back to the same focal position from which they were emitted.

A further object is to provide an optical combiner wherein a single focusing lens is utilized to uniformly and efficiently combine n separate wavelength channels by passing each channel through a separate radial sector of the focusing lens.

Another object of the present invention is to integrate a fiber optic connector within the optical module, to passively align an optical fiber to the coupling optic.

Further objects and advantages will become apparent from the following description and drawings.

DETAILED DESCRIPTION OF THE INVENTION

Figure 1:
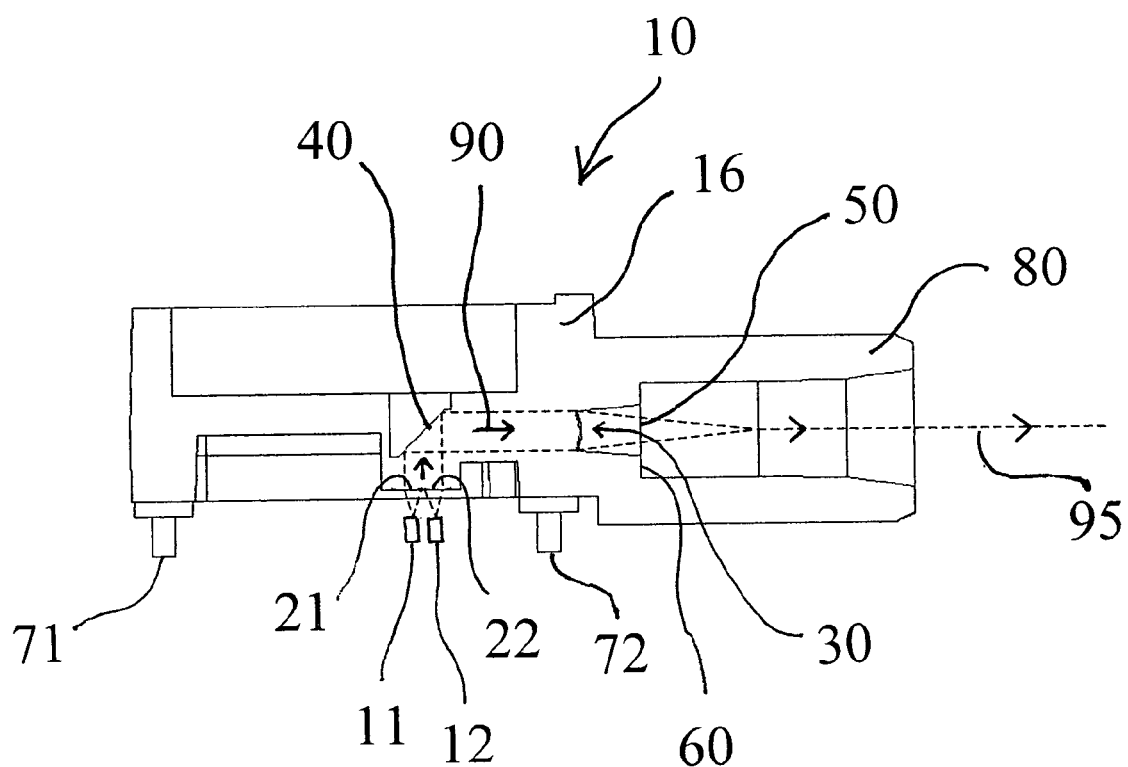
FIG. 1 is a side elevational, sectional view of a combiner of the present invention.
Figure 2:
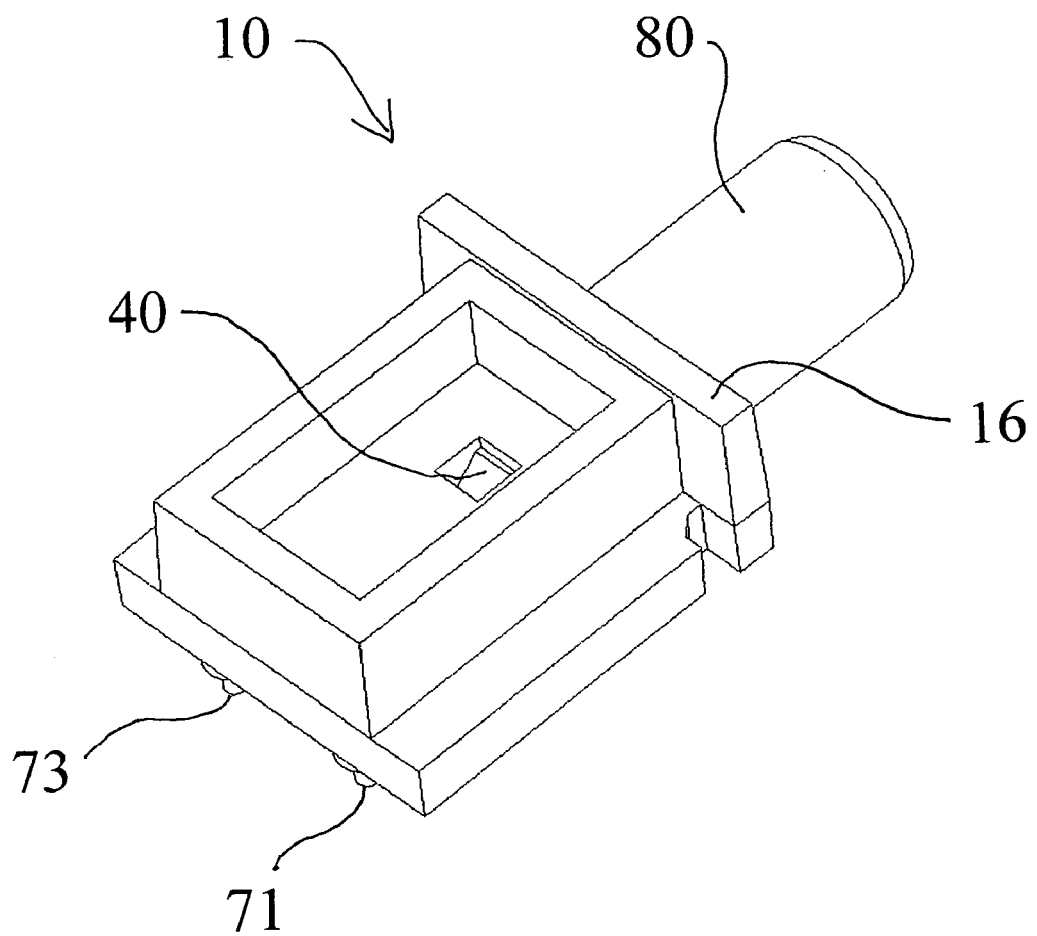
FIG. 2 is an isometric top view of the combiner of FIG. 1.
Figure 3:
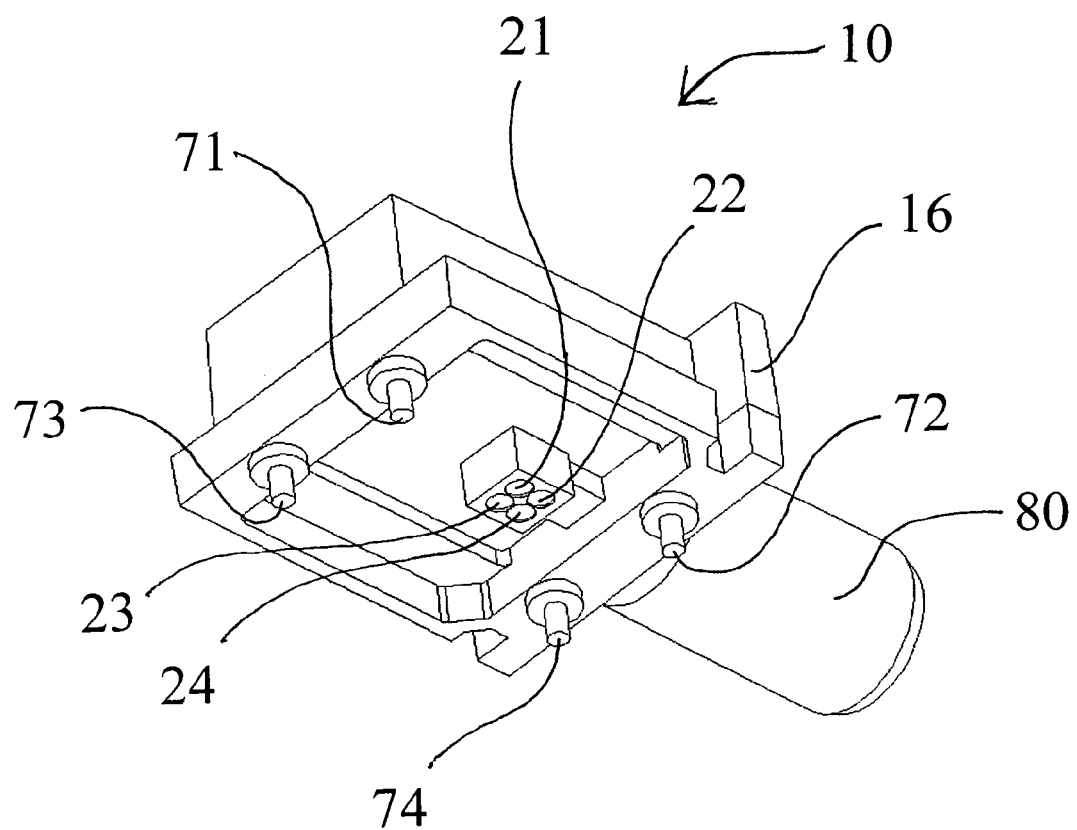
FIG. 3 is an isometric bottom view of the combiner of FIGS. 1 and 2.
Figure 4:
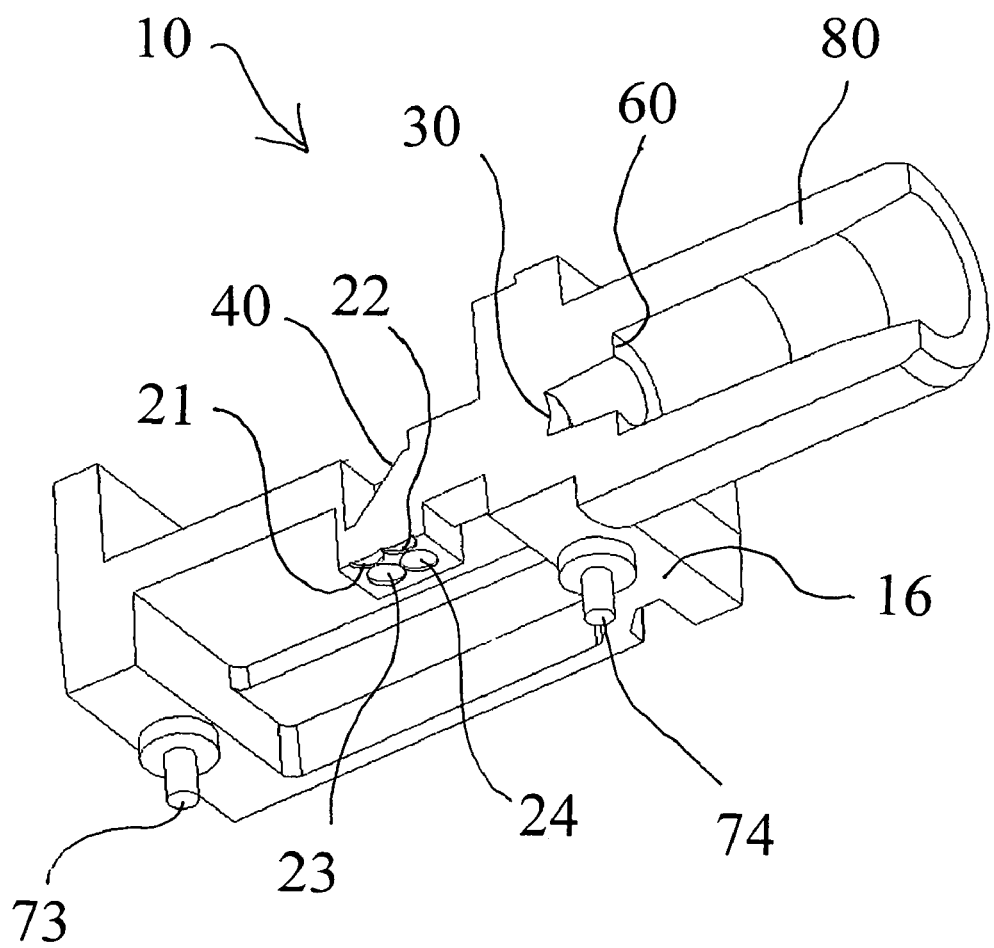
FIG. 4 is a cross-sectional isometric side view of the combiner of FIGS. 1–3.

FIGS. 1–4 show an optical combiner 10 that illustrates a first embodiment of the present invention. The combiner 10 in this embodiment includes four spaced apart input collimating lenses 21,22, 23,24 and output focusing lens 30. Lasers 11,12 are located at the focal points of the input lenses and the light is collimated, reflected off a prism 40 and focused by the focusing lens 30 onto a spot at which a single optical fiber (not shown) is stopped by fiber stop or seat 60 formed in ferrule 80. Pins 71,72,73,74 are located to aid in affixing the combiner device 10 to the support (not shown) for the lasers. The integrated ferrule 80 enables one to place an output fiber optic cable into the pre-aligned connector.

This combiner device has the ability to combine individual light signals into an optical path 90 that can be directed towards an optical fiber (not shown for clarity). Matching the NA of the larger focusing lens 30 and the NA of the fiber (not shown) inserted into ferrule 80, seated at the fiber stop 60, as well as the spot size 50 of the focused beam being made smaller then the fiber core couples a maximum amount of the collimated light into the fiber. Similarly, by arranging four (in this embodiment) collimating lenses 21,22,23,24 of a size small enough to fit inside the diameter of the focusing lens 30, and matching their NA to the light sources, the maximum amount of light will couple into the collimated output beam 95.

The first embodiment of the invention is a combiner 10 comprised of a single piece plastic molded coupling module 16 consisting of four collimating lenses 21–24 and one lens 30 for focusing several geometrically placed collimated beams onto the output fiber (not shown) and a prism 40 for reflecting the plurality of collimated beams for maximum coupling efficiency into the output fiber.

The plastic molded coupling module 16 is formed by integrating an aspherical on-axis, offset collimating lens array 21–24, a redirectional prism 40, a focusing lens 30, a fiber optic ferrule 80, and mechanical pins 71–74 for alignment of the optical part 16 to an array of four lasers, all within a single part 16.

The invention is usable with n lasers and n collimating lenses. The embodiment shown in FIGS. 1–4 illustrates the case of n=4. Furthermore, FIGS. 1–4 utilize a two-dimensional, two by two array of input lasers as well as collimating lenses.

Figure 5:
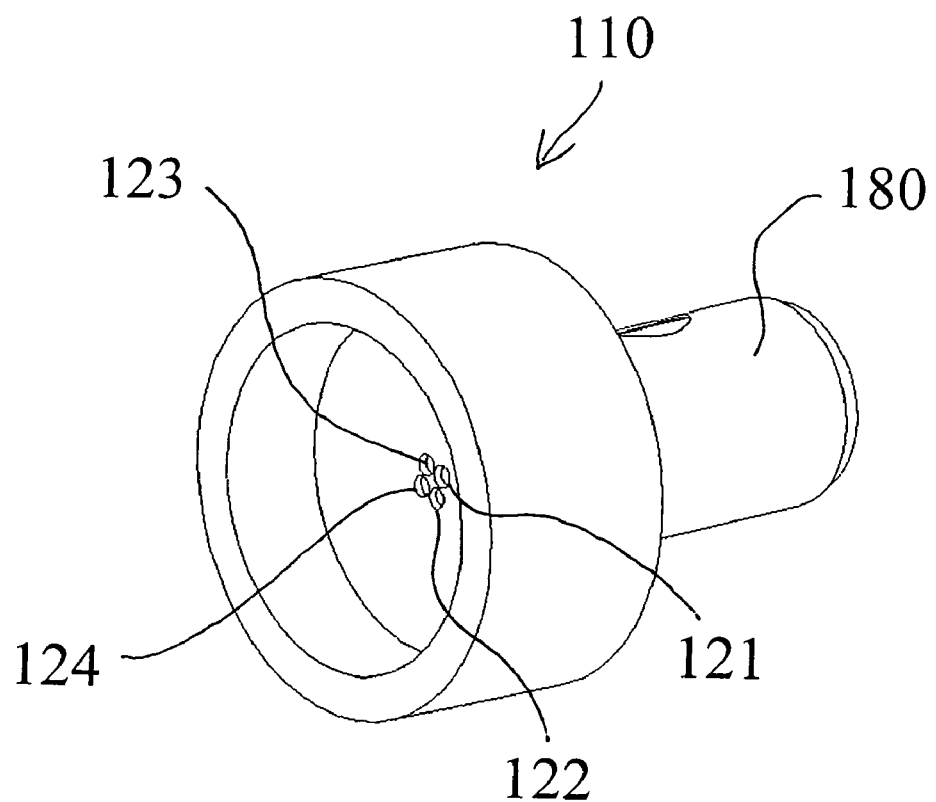
FIG. 5 is an isometric view of a second embodiment of the invention.
Figure 6:
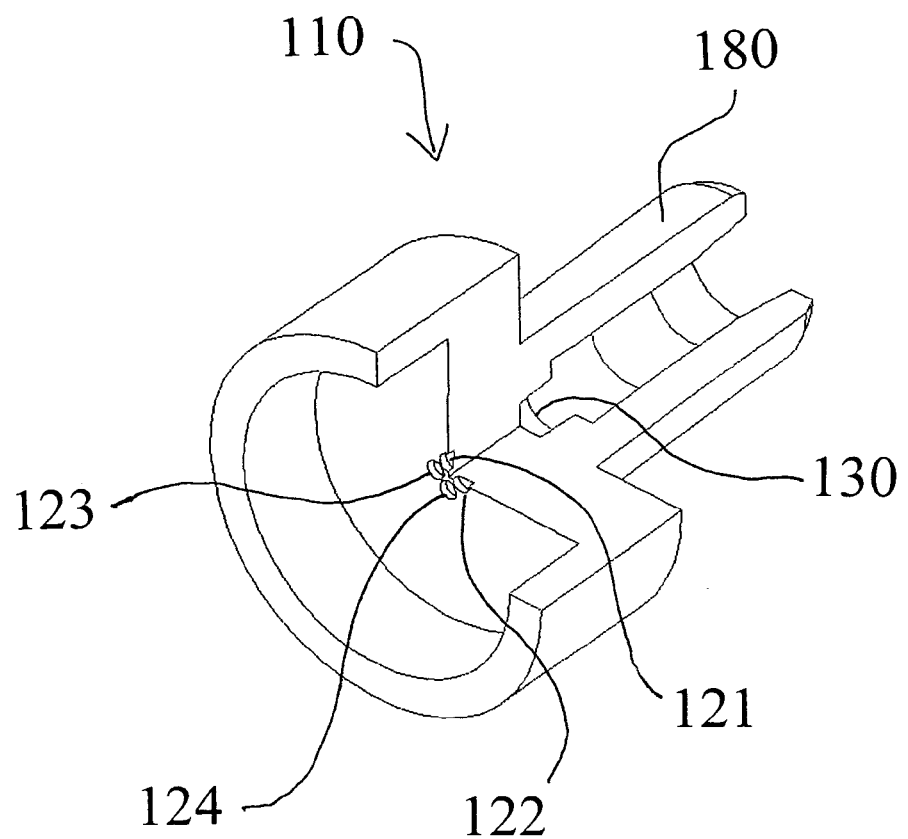
FIG. 6 is an isometric cross-sectional view of the second embodiment of FIG. 5.

FIGS. 5 and 6 show a second embodiment of the invention 110 which does not include a prism for translating the optical beams from one axis to another. This particular embodiment is beneficial for mating to a standard "TO" style laser chip package. Similar to the embodiment described in FIGS. 1–4, the embodiment shown here utilizes a two-dimensional array of four lenses 121,122,123,124 for collimating the input light signals from a two-dimensional, two by two, array of lasers (not shown), a single focusing lens 130, and a fiber connector 180 that allows one to place a fiber optic cable into the pre-aligned connector.

Figure 7:
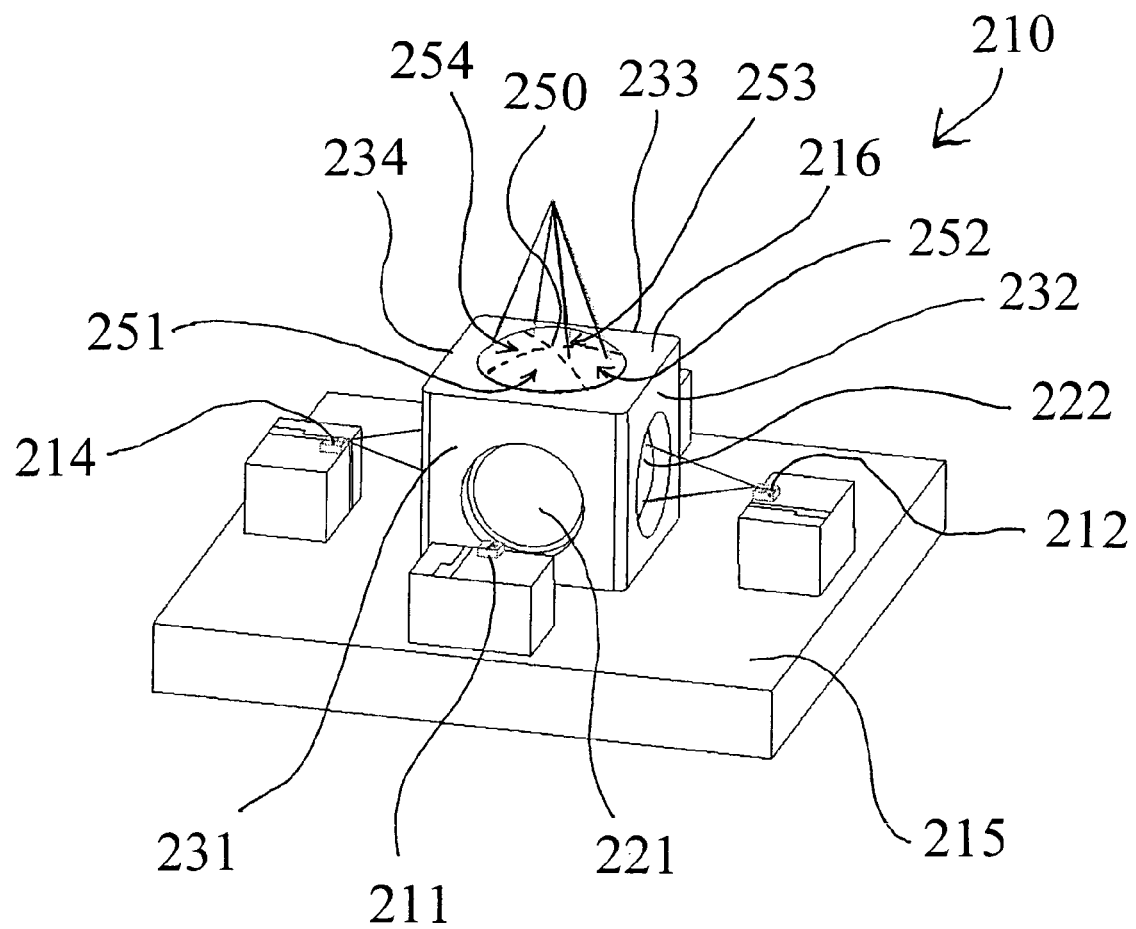
FIG. 7 is a perspective view of a third embodiment of the invention.
Figure 8:
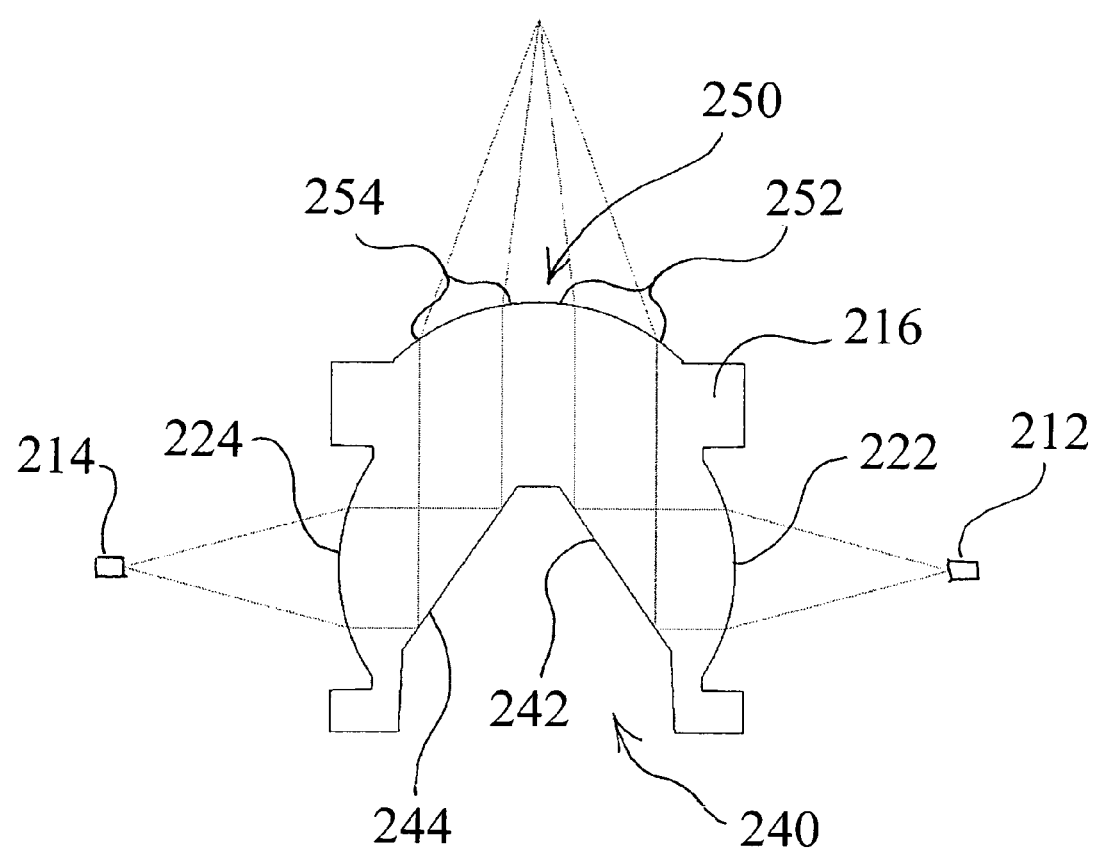
FIG. 8 is a sectional view of a portion of the third embodiment shown in FIG. 7.
Figure 9:
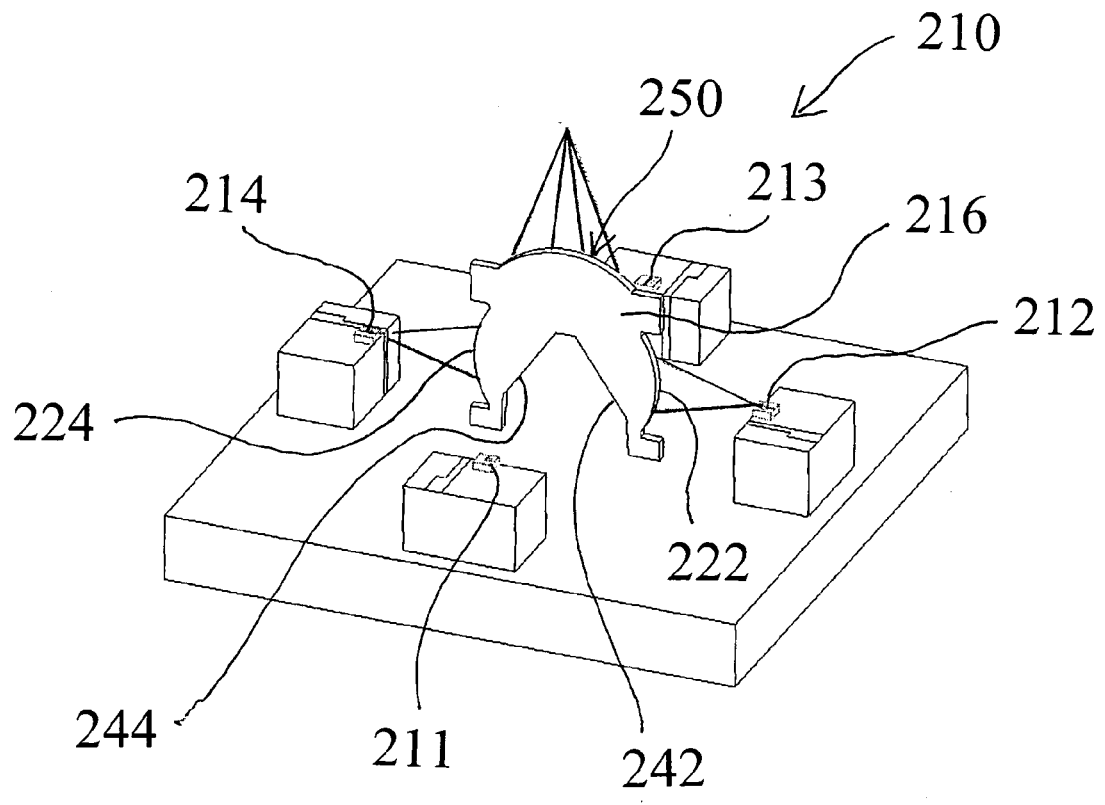
FIG. 9 is a perspective view of the third embodiment shown in FIGS. 7 and 8, wherein a slice of the molded coupling optic is shown to illustrate the invention.

FIGS. 7, 8 and 9 illustrate a third embodiment of the invention. The combiner is shown generally as 210 and includes a circular array of four lasers 211,212,213 and 214. Each laser 211–214 has a different output wavelength. Each laser is mounted to a support 215. The lasers 211–214 are co-planar and the output beam of each of the lasers 211–214 is directed towards the center of the array. At the center of the array is a coupling optic 216 formed of a single monolithic optical block. Four collimating lenses (only two of which 221 and 222 are visible) are formed in the four side walls 231,232,233 and 234, respectively, of the module or coupling block 216. The focusing lens 250 is formed on the top surface of the module 216. The surface of focusing lens 250 is smooth and includes four pie-shaped radial quadrants 251–254. Each of the quadrants 251–254 transmits a separate output beam of the lasers 211–214, respectively.

As shown best in FIG. 8, the bottom surface 240 of module 216 is recessed with four separate inclined surfaces that form four separate prisms to reflect collimated light to the output lens 250. In the view shown in FIG. 8, collimating lenses 222 and 224 receive the output beams from lasers 212 and 214, respectively. Prisms 242 and 244 reflect the output beams from collimating lenses 222 and 224 and direct those beams through separate pie-shaped quadrants 252 and 254 of focusing lens 250.

It is significant to note that, as shown in FIG. 8, the output beams of lasers 212 and 214 are refracted through output lens 250 through equal angles. This is significant because the beam passing through quadrant 252 will not be reflected by the stopped single fiber optic back into laser 212. Rather, the laser output 212 passing through quadrant 252 will tend to be reflected from the stopped fiber optic back towards quadrant 254. Since the output of laser 212 is of a different wavelength than the output of laser 214, that reflection that passes back through quadrant 254 from laser 212 will not adversely affect the performance of laser 214, since it operates at a different wavelength.

FIG. 9 shows a single slice of optic 216 to more clearly illustrate the interaction with the module 216 with the circular array of lasers 211–214.

Figure 10:
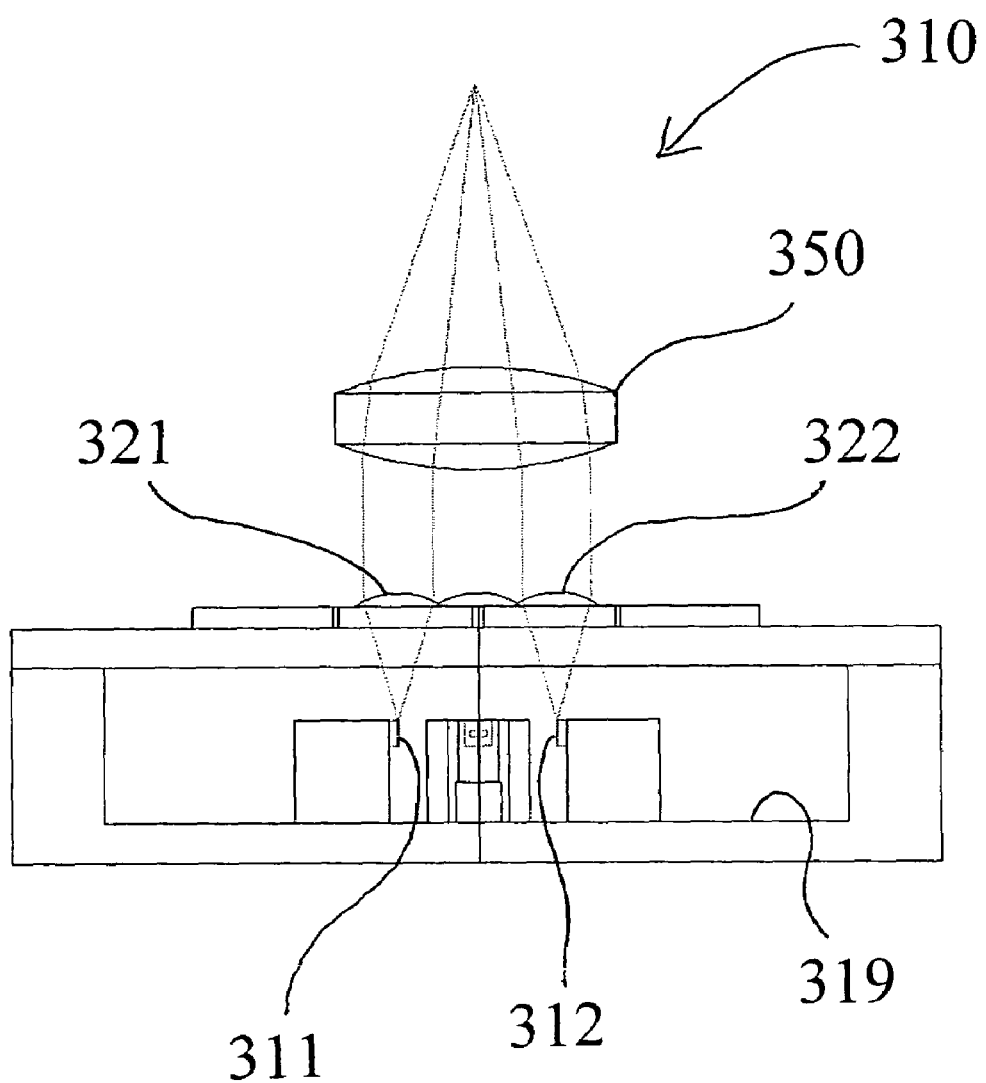
FIG. 10 is a side elevational view of a fourth embodiment of the invention.
Figure 11:
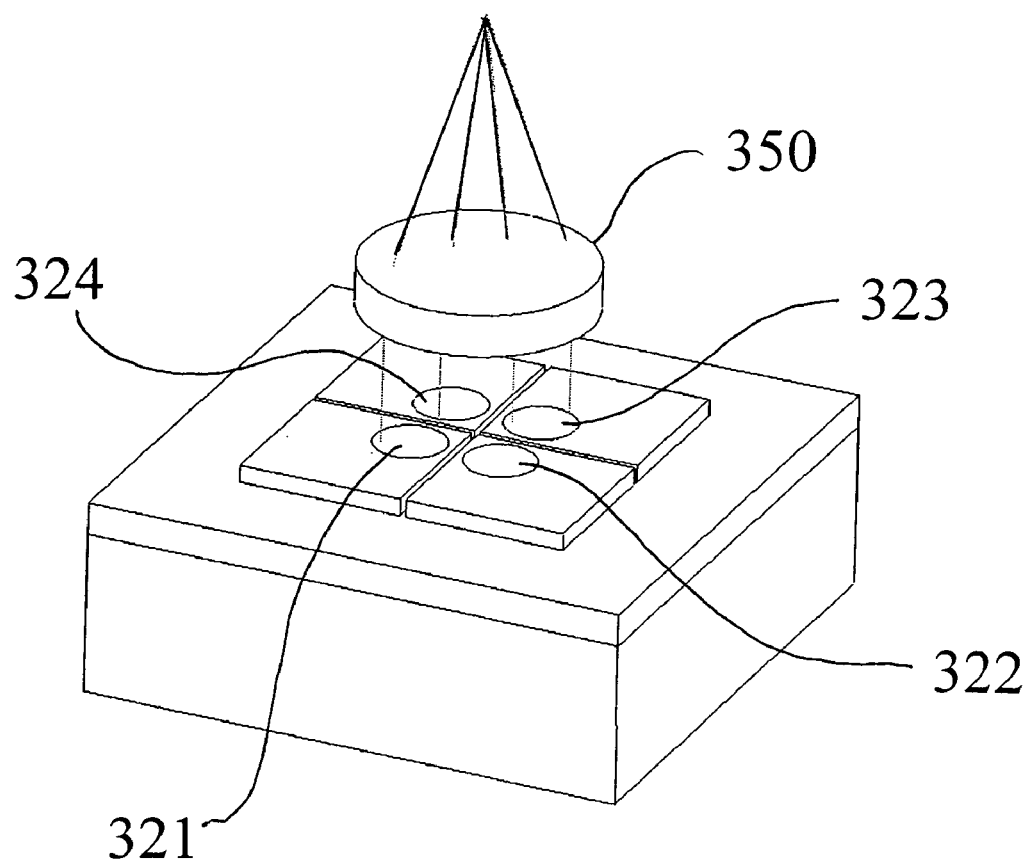
FIG. 11 is a top isometric view of the fourth embodiment shown in FIG. 10.

FIGS. 10 and 11 illustrate a fourth embodiment of the invention. In this embodiment, the combiner shown generally as 310 includes a two-piece molded module including a separately molded output lens 350 and separately molded collimating lenses 321–324. The collimating lenses 321–324 are preferably molded into a single but separate monolithic block of molded material so that the combiner 310 includes two separate molded optics. The focusing lens 350 is supported in its position shown in FIG. 10 by means known to those skilled in the art which are deleted in the interest of brevity. As shown in FIG. 10, an array of four lasers are supported in housing 319. In the view shown in FIG. 10, only two lasers 311 and 312 are visible. Their output beams are directed through collimating lenses 321 and 322 and in the embodiment shown in FIGS. 10 and 11 travel directly to and through focusing lens 350 without being reflected by a prism. Collimating lenses 321–324 are supported by the top of housing 319.

Key Features:

Manufacturing throughput Replication procedures are extremely fast, thus reducing the overall cost of the manufactured device.

Passive Alignment All of the optical components within the multiplexer could utilize passive alignment mechanisms.

Monolithic Coupling Optics Each optical coupling and redirectional component is integrated within a single monolithic plastic-molded device in most embodiments.

Cost Reduction Fewer parts are required such as filters and reflector blocks.

Offset Launch Spots may be focused on a section of the fiber which is offset from the center of the fiber, thus creating an offset launch condition, which is known by those skilled in the art to produce a better condition for resisting modal partition noise.

Potential Applications:
1) Wavelength division multiplexing/demultiplexing (WDM)
2) Optical signal routing
3) Spectroscopy
4) Biological and chemical integrated optical sensors
5) Optical computing The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. An optical combiner usable in data communication systems for multiplexing the outputs of a plurality of n lasers wherein each of said n outputs has a different output wavelength, for transmission into and through a stopped single optical fiber, comprising:
    a plurality of n collimating lenses, said lenses being spaced apart and positioned to receive and collimate the output of said n laser output beams, said n laser output beams have n different output wavelengths, and
    focusing means for focusing said n collimated output beams onto a single spot at said stopped single optical fiber, said focusing means having n separate radial sectors on its surface, and each of said n collimated beams passes through a separate one of said n sectors of said focusing means whereby said n output beams having n different wavelengths are coupled into said single fiber.

2. The optical combiner of claim 1 wherein n=4 and wherein said four lasers and four collimating lenses are each formed in a two-dimensional, two by two array, wherein said focusing means is a single focusing lens, and wherein each radial sector is a pie-shaped quadrant.

3. The optical combiner of claim 2 wherein a prism is positioned between each of said collimating lenses and said focusing lens, and wherein said collimating lenses, said prism and said focusing lens are formed as a single, monolithic molded block.

4. The optical combiner of claim 3 wherein said single monolithic block has a top surface, a bottom surface, and four side surfaces, said top surface forming said focusing lens, each of said four side surfaces forming one of said collimating lenses, and said bottom surface being formed to include four separate prisms, each of said prisms reflecting a laser output beam passing through one of said collimating lenses onto one of said quadrants of said focusing lens.

5. The optical combiner of claim 4 wherein said four lasers are positioned in a circular array with their output beams directed toward the center of said array, all of said output beams lying in a common plane, and said single monolithic block is positioned at the center of said circular array.

6. The optical combiner of claim 1 wherein said optical combiner does not require the use of dielectric filters or waveguides.

7. An optical combiner usable in data communication systems for multiplexing the outputs of a plurality of lasers wherein each of said outputs has a different wavelength, for transmission into and through a stopped single optical fiber, comprising:
    an array of four lasers, formed in a two-dimensional, two by two array, each of said lasers having an output beam with a different wavelength,
    an array of four collimating lenses, said lenses being formed in a two-dimensional, two by two array and positioned to receive and collimate the output of said laser output beams, and
    focusing means for focusing said collimated output beams onto a single spot at said stopped single optical fiber, said focusing means having four separate quadrants on its surface, and each of said four collimated beams passes through a separate one of said quadrants of said focusing means whereby said output beams of said four lasers are coupled into said single fiber.

8. The optical combiner of claim 7 wherein a prism is positioned between each of said collimating lenses and said focusing lens, and wherein said collimating lenses, said prism and said focusing lens are formed as a single, monolithic molded block.

9. The optical combiner of claim 7 wherein said optical combiner does not require the use of dielectric filters or waveguides.

* * * * *